United States Patent [19]

Fujio

[11] 4,208,857
[45] Jun. 24, 1980

[54] SLEEVE SEAL FITTING MACHINE

[76] Inventor: Masaaki Fujio, 3-15-8, Aoyamadai, Suita-shi, Japan

[21] Appl. No.: 916,286

[22] Filed: Jun. 16, 1978

[30] Foreign Application Priority Data

Jun. 27, 1977 [JP] Japan ................................. 52/75580

[51] Int. Cl.² ............................................. B29C 27/00
[52] U.S. Cl. ..................................... 53/585; 29/235;
53/567; 156/86; 156/556
[58] Field of Search ................. 156/86, 294, 423, 556;
29/235; 53/442, 557, 567, 585

[56] References Cited

U.S. PATENT DOCUMENTS

| | | | |
|---|---|---|---|
| 2,089,769 | 8/1937 | Strout | 53/585 X |
| 2,579,458 | 12/1951 | Allen et al. | 156/423 |
| 2,852,899 | 9/1958 | Murrell | 53/585 |
| 3,551,258 | 12/1970 | Galvanoni et al. | 156/556 |
| 3,900,941 | 8/1975 | Browning et al. | 29/235 X |
| 4,016,704 | 4/1977 | Fujio | 156/86 |
| 4,072,553 | 2/1978 | Braker et al. | 156/86 |

Primary Examiner—Michael G. Wityshyn

[57] ABSTRACT

A machine for fitting a sleeve seal to a container or other object without twisting of the sleeve seal and tearing or crumpling of a label on the container by the sleeve seal, which is attained by providing flexible guide members arranged on a streamline-form mandrel, a recess on the bottom of the mandrel, into which the container over which the sleeve seal is to be fitted can be received, and a feed member which is pivoted away from at operating position to disengage position.

4 Claims, 9 Drawing Figures

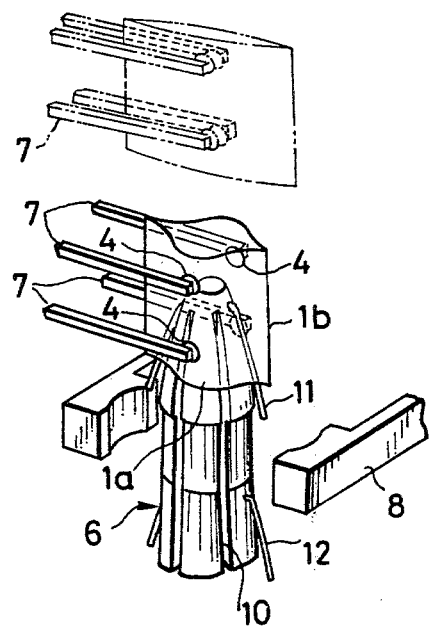
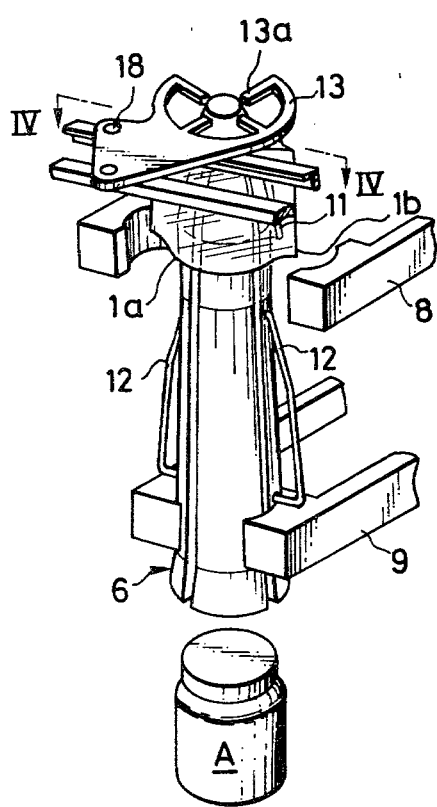

SLEEVE SEAL FITTING MACHINE

This invention relates to a machine for fitting a sleeve seal to a container or other object.

A conventional sleeve seal fitting machine is well-known, in which a sleeve seal which is made by cutting a soft heat-shrinkable film tube to a proper length, is first fitted to the top end of a vertically positioned streamline-form mandrel and is moved downwards by a feed member which is movable up and down. Then the sleeve seal is pushed down from the lower end of the mandrel and is fitted over a container positioned directly under the mandrel whose bottom diameter is arranged to be larger than that of the container.

However, this machine has defects. For example, as the sleeve seal is fitted to the mandrel and is moved downwards therealong, the sleeve seal is often twisted because of the uneven forces acting on it, so that if, for example, a label is printed on the sleeve, it will be in the wrong position on the container.

As the sleeve seal is fitted to the container, if the center of the container placed under the mandrel is offset slightly from the central axis of the mandrel, the lower end of the sleeve seal sometimes catches the label applied to the container, thereby causing the label to tear or crumple.

Further, when the sleeve seal is moved down to just above the container by the feed member, since the feed member is prevented from further movement by the container, the feed member is stopped temporarily until the container fitted with the sleeve seal is transferred. This step involves stopping the movement of the next coming sleeve seal, and hence interferes with quick operation.

It is an object of the present invention to provide a sleeve seal fitting machine free from the abovementioned defects, which prevents twisting of the sleeve seal and tearing or crumpling of a label on the container by the sleeve seal and which enables faster operation.

According to the present invention there is provided a sleeve seal fitting machine comprising:

a streamline-form mandrel adapted to be positioned with one end over an object to which a sleeve seal is to be fitted, the diameter of the lower end of the mandrel being greater than that of the object;

a means for supplying a sleeve seal to the mandrel; and a feed member adapted to push the sleeve seal along the mandrel toward the object to which the sleeve seal is to be fitted, characterized by flexible guide members arranged on the mandrel in such a way that as a sleeve seal slides along the mandrel, the flexible guide members prevent the sleeve seal from twisting.

In order that the details of the present invention may be understood, one preferred embodiment will now be described with reference to the accompanying drawings, in which:

FIG. 2 is a fragmentary perspective view of the sleeve seal fitting machine of FIG. 1;

FIG. 3 is a fragmentary perspective view of the sleeve seal fitting machine of FIG. 1, showing a sleeve seal about to be moved down along the mandrel;

Figure 1:
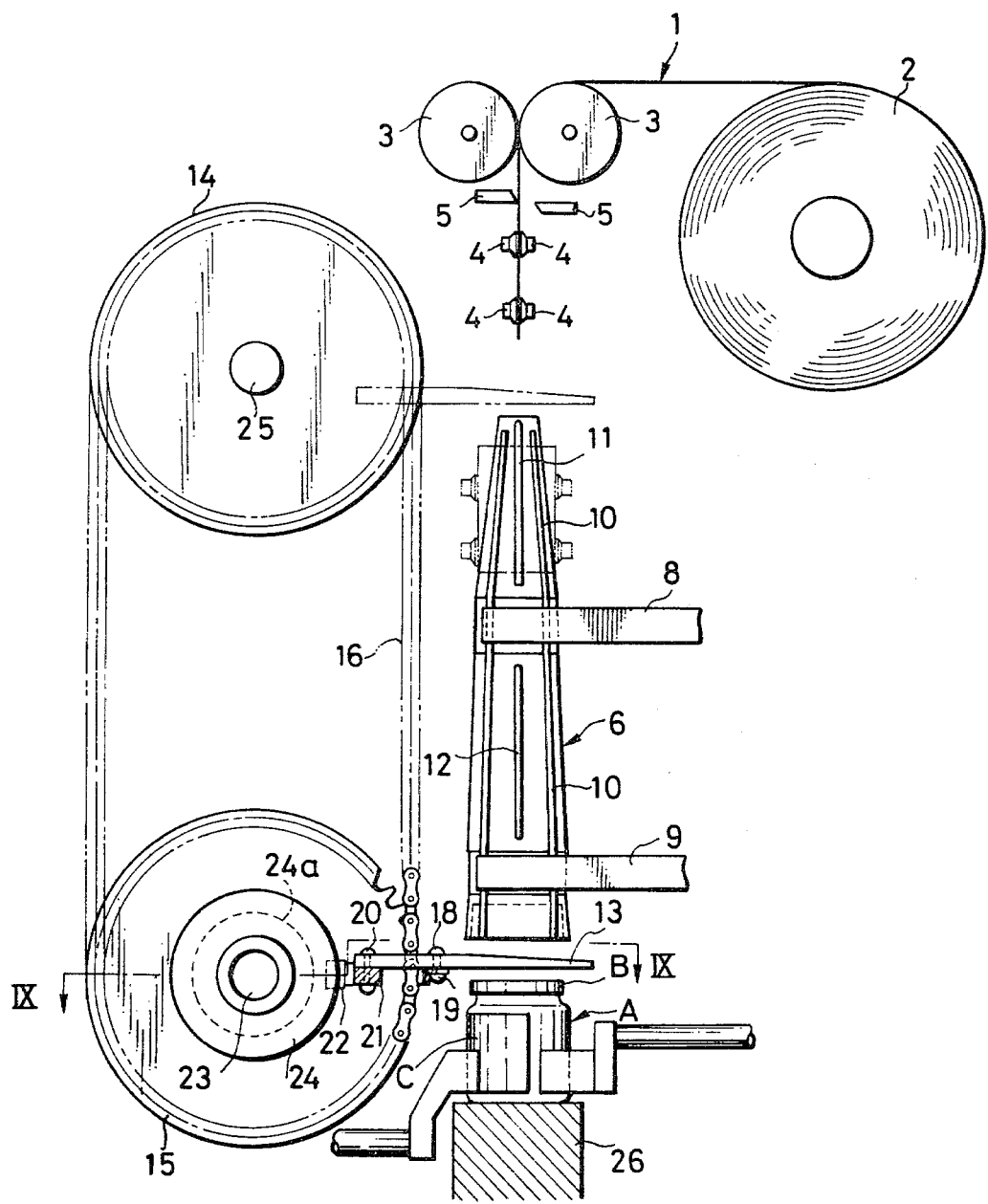
FIG. 1 is a schematic view of an embodiment of a sleeve seal fitting machine according to the present invention.

As shown in FIG. 1, a soft heat-shrinkable plastic film sleeving 1 stored on a roll 2 in a flattened form is fed intermittently a suitable amount by feeding rollers 3. The sleeving 1 thus fed is held by pairs of suction cups 4 connected to a suction pump (not shown), is moved down, and is cut into a proper length by a cutter 5. The cut sleeving, i.e. a sleeve seal 1a, is supplied to the mandrel 6 from the top thereof.

Alternatively, sleeve seals 1a which are precut to the proper length and stored in a magazine case, may be taken out one by one therefrom by using the suction cups 4.

Each suction cup 4, as shown in FIG. 2, is supported by an arm 7 which is movable up and down and also inwards and outwards. After a sleeve seal 1a is cut from the tube 1 by the cutter 5, the suction cups 4 retaining both surfaces of the sleeve seal 1a are moved outwards so as to open the folded sleeve seal 1a. The suction cups 4 are simultaneously moved downwards in order to fit the opened sleeve seal 1a onto the top of the mandrel 6, as shown in FIG. 2 by solid lines.

When the sleeve seal 1a is fitted to a predetermined position on the mandrel 6 by the suction cups 4, the suction cups 4 are removed from the sleeve seal 1a and returned to their normal positions.

The mandrel 6 has a streamline-form and a bottom diameter which is larger than the diameter of a container A to which the sleeve seal 1a is to be fitted. The mandrel 6 is positioned vertically with a container being positioned immediately beneath it. The mandrel 6 is held alternately by two pairs of upper and lower clamp means 8 and 9, as shown in FIG. 3, which are positioned at upper and lower positions of the mandrel 6; the clamp means 8 and 9 not only hold the mandrel 6 but also move it up and down.

Figure 4:
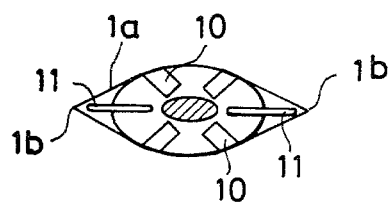
FIG. 4 is a horizontal sectional view taken along the line IV—IV in FIG. 3.
Figure 5:
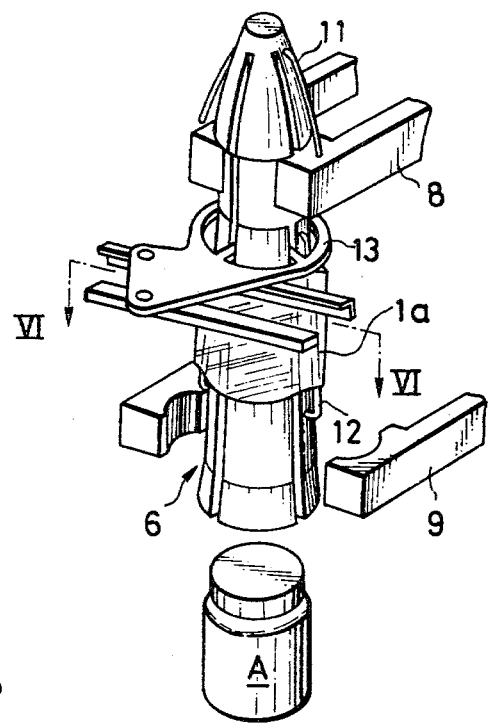
FIG. 5 is a fragmentary perspective view of the sleeve seal fitting machine of FIG. 1, in which a sleeve seal is being pushed down along the mandrel.
Figure 6:
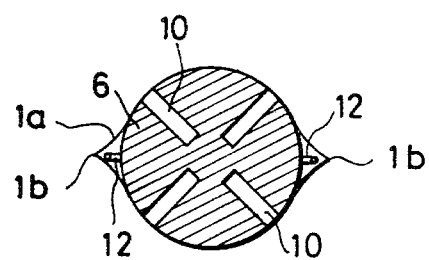
FIG. 6 is a horizontal sectional view taken along the line VI—VI in FIG. 5.
Figure 7:
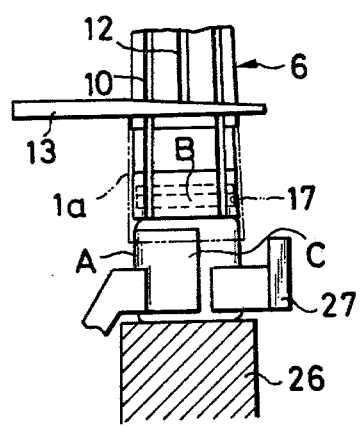
FIG. 7 is a fragmentary schematic view of the sleeve seal fitting machine of FIG. 1, in which a sleeve seal is partly fitted to a container.

The mandrel 6 comprises a top portion above a body portion. The top portion of the mandrel 6 is formed in a flattened cone shape, as shown in FIG. 4, and the body portion, as shown in FIG. 6, is circular in section and its diameter increases gradually to the lower end, where it is larger than that of the container A.

The mandrel 6 is provided with longitudinal grooves 10 therealong, through which a feed member 13 hereinafter referred to moves along the mandrel 6. Two pairs of flexible upper and lower guide members 11 and 12 for preventing twisting of the sleeve seal 1a are arranged longitudinally on opposite surfaces of the top portion and the body portion of the mandrel 6 at their top ends. The upper and the lower guide members 11 and 12 are separated by an upper clamping portion of the mandrel 6, onto which the upper clamp means 8 grip.

The free lower end portions of the guide members 11 and 12 are sprung outwards. The lower ends of the lower guide members 12 are bent inwards at right angle and are inserted freely into corresponding holes formed on the surface of the mandrel 6. The lower ends of the lower guide members 12 are above the lower clamping portion of the mandrel 6 so that the lower clamp means 9 may hold the mandrel 6 without interfering with the lower guide members 12.

At each side the upper and lower guide members 11 and 12, may be formed as an integral member, if desired.

The sleeve seal 1a placed on the top of the mandrel 6, as shown in FIG. 3, is prevented from twisting and is held in the stretched condition by the upper guide member 11. In the embodiment, the folded ends 1b of the sleeve seal 1a are adapted to be stretched by the upper guide members 11.

The feed members 13 having inwardly facing projections 13a are mounted to a pair of chains 16 (only one is shown) at certain interval, each chain 16 being supported by a pair of upper and lower sprockets 14 and 15 which are mounted on a pair of upper and lower sprocket shafts 25 and 23 and are arranged near the upper and the lower parts of the mandrel 6. When the chains 16 are driven by rotating the sprockets 14 and 15 by means of a motor (not shown), the feed members 13 are moved along the mandrel 6 from the top to the bottom and the projections 13a of the ring member 13 engage with the grooves 10 of the mandrel 6. The sleeve seal 1a is thus pushed down along the mandrel 6 by the feed member 13.

When the sleeve seal 1a is positioned at the top portion of the mandrel 6, the mandrel 6 is held by only the lower clamp means 9, as shown in FIG. 3. The sleeve seal 1a is pushed down by the feed member 13, and after passing the sleeve seal 1a through the upper clamping portion of the mandrel 6, the upper clamp means 8 hold the mandrel 6 and the lower clamp means 9 are released from the mandrel 6.

The sleeve seal 1a is transferred from the upper guide members 11 to the lower guide members 12 and its folded ends 1b are still adapted to receive and be stretched by the lower guide members 12 in order to preserve its orientation.

When the lower clamp means 9 release the mandrel 6, the upper clamp means holding the mandrel 6 move the mandrel 6 down to the top of the container A.

Figure 8:
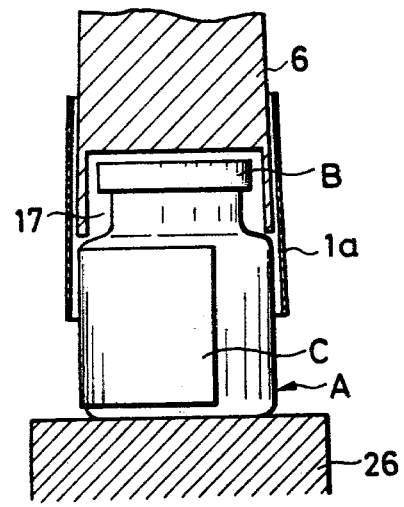
FIG. 8 is an enlarged fragmentary vertical sectional view of the machine shown in FIG. 7.
Figure 9:
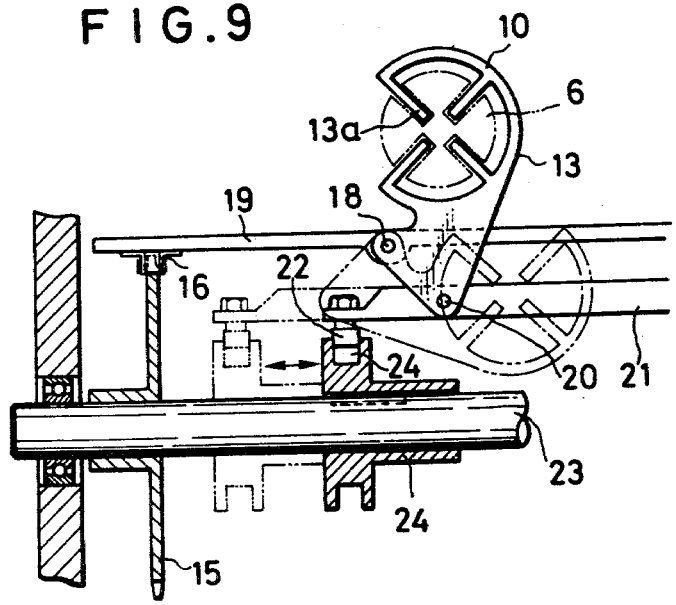
FIG. 9 is a horizontal sectional view taken along the line IX—IX in FIG. 1.

In the bottom of the mandrel 6 is provided a recess 17, which can receive a cap B and the upper part adjacent to the label C of the container A, as shown in FIGS. 8 and 9. The container A is adapted to be centered by and in the recess 17 with respect to the central axis of the mandrel 6, and thus the lower end of the mandrel 6 overhangs closely the container A. When the mandrel 6 receives the upper part of the container A, its movement is stopped.

The feed member 13 continues to move down to push the sleeve seal 1a from the lower end of the mandrel 6, fits it to the container A positioned directly under the mandrel 6, and then stops. Immediately before the feed member 13 stops, the upper clamp means 8 start to lift the mandrel 6 and continue moving it up until the mandrel 6 returns to the normal position through the sleeve seal 1a and the feed member 13. When the mandrel 6 is returned to the normal position, the lower clamp means 9 grip the mandrel 6 and the upper clamp means 8 are released.

As shown in FIG. 9, each feed member 13 is pivotally coupled to a support arm 19 connected to the chains 16 at one side of the base part of the feed member 13 by a pivot pin 18. The feed member 13 is also pivotally connected to a slide lever 21 by a pivot pin 20. A cam follower 22 is mounted to the slide lever 21, and engages with a guide groove 24a of a slide guide member 24 which is slidably fitted on the lower sprocket shaft 23 when the feed member 13 comes down to the lowermost position directly above the container A with respect to the mandrel 6.

When the mandrel 6 has passed through the feed member 13, the slide guide member 25 is then slid to the left in FIG. 9 by an actuating mechanism (not shown), resulting in pivoting horizontally the feed member 13 toward the shaft 23 to a disengaged position, as shown in FIG. 9 by the two-dotted lines.

Then, the chains 16 are driven again by the motor and the feed member 13 is moved upwards round the outside of the sprockets 14 and 15.

Another slide guide member 24 (not shown) is slidably fitted on the upper sprocket shaft 25. When the suction cups 4 have supplied the sleeve seal 1a onto the top portion of the mandrel 6 and returned to their normal position, the feed member 13 in the disengaged position is pivoted to the operation position above the mandrel 6 by sliding the slide guide member 24 in the reverse manner to that described above.

As soon as the feed member 13 is pivoted to the disengaged position, the container A to which the sleeve seal has been fitted is transferred on a conveyor 26 by a clamp means 27 from under the mandrel 6 to a next step (such as a heat-processing step), and a new container A is moved under the mandrel 6. The next sleeve seal 1a is supplied onto the mandrel 6, as the mandrel 6 moves up from the container A and returns to its normal position.

The machine operates by repeating the single cycle of the process as described above.

From the description above, it will be seen that according to the present invention the sleeve seal 1a supplied to the top of the mandrel 6 can be positively moved down with the aid of the flexible guide members 11 and 12 and fitted onto the container in the correct position without twisting, so as to ensure that, for example, a label C printed on the sleeve seal 1a.

The upper and lower flexible guide members 11 and 12 are suitably spaced apart so that the upper clamp means 8 may securely grip the mandrel in its clamping portion.

It will further be seen that according to the present invention, since the upper part of the container A is held in the recess 17 formed in the bottom of the mandrel 6 and is centered in the bottom groove 17 with respect to the central axis of the mandrel 6, and the lower end of the mandrel overhangs closely the container A without danger of the sleeve seal 1a catching a label C attached to the container A and tearing or crumpling it.

It will be readily understood that according to the present invention the feed member 13 is pivoted in the horizontal plane to the disengaged position after fitting the sleeve seal 1a to the container A so that the feed member 13 will not obstruct the movement of the container A, and accordingly the operation speed can be increased.

Although the invention has been described in terms of a preferred embodiment, various changes and omission in the form and detail thereof can be made by those skilled in the art without departing from the scope of the invention.

What is claimed is:

1. A sleeve seal fitting machine, for fitting a sleeve seal over an object, comprising:

a streamline-form mandrel adapted to be positioned with its lower end over the object, the size of the lower end being greater than that of the object;

a means for supplying the sleeve seal to the upper end of the mandrel;

a feed member for pushing the sleeve seal along the mandrel toward the object;

an upper and a lower means for clamping the mandrel, which are adapted both to hold the mandrel and to move it axially towards and away from the object, and which bear on axially different parts of the mandrel;

and flexible guide members mounted on the mandrel which resiliently stand proud of its surface, so that as the sleeve seal is pushed along the mandrel said guide members tend to prevent it twisting.

2. The machine of claim 1, wherein each of the flexible guide members is formed in two parts which are axially spaced from one another along the axis of the mandrel and separated from one another by a portion of the mandrel on which the upper clamping means bears.

3. The machine of claim 1 or 2, wherein the lower end of the mandrel is formed with a recess for receiving the upper end of the object, and wherein the mandrel is tapered.

4. The machine as set forth in claim 2 wherein means are provided to pivotally move the feed member away from an operating position as soon as it has finished pushing the sleeve seal from the mandrel.

* * * * *